(12) United States Patent
An (10) Patent No.: US 12,451,773 B2
(45) Date of Patent: Oct. 21, 2025

(54) MOTOR MANUFACTURING METHOD AND MOTOR MANUFACTURING SYSTEM

(71) Applicant: HL MANDO CORPORATION, Gyeonggi-do (KR)

(72) Inventor: Young Kyu An, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 620 days.

(21) Appl. No.: 17/626,813

(22) PCT Filed: Jun. 23, 2020

(86) PCT No.: PCT/KR2020/008171
§ 371 (c)(1),
(2) Date: Jan. 12, 2022

(87) PCT Pub. No.: WO2021/015427
PCT Pub. Date: Jan. 28, 2021

(65) Prior Publication Data
US 2022/0360148 A1 Nov. 10, 2022

(30) Foreign Application Priority Data
Jul. 19, 2019 (KR) .................. 10-2019-0087429

(51) Int. Cl.
*H02K 13/00* (2006.01)
*H01R 39/04* (2006.01)
(Continued)

(52) U.S. Cl.
CPC ........... *H02K 13/006* (2013.01); *H01R 39/04* (2013.01); *H02K 13/10* (2013.01); *H02K 15/00* (2013.01)

(58) Field of Classification Search
CPC ...... H01R 39/04; H02K 13/006; H02K 15/00; H02K 1/17
See application file for complete search history.

(56) References Cited

U.S. PATENT DOCUMENTS

2002/0073532 A1* 6/2002 Blaettner ............... H02K 13/10
29/597
2003/0080647 A1* 5/2003 Tanaka .................. H01R 43/14
310/233

FOREIGN PATENT DOCUMENTS

CN 1440093 A * 9/2003
CN 206226155 6/2017
(Continued)

OTHER PUBLICATIONS

International Search Report for PCT/KR2020/008171 mailed on Nov. 19, 2020 (now published as WO 2021/015427) with English translation provided by WIPO.
(Continued)

*Primary Examiner* — Livius R. Cazan
(74) *Attorney, Agent, or Firm* — WOMBLE BOND DICKINSON (US) LLP (57) ABSTRACT

The present disclosure relates to a method and system for manufacturing a motor in which noise and current ripple caused by mechanical friction between a brush and a commutator have been reduced. In detail, a motor manufacturing method of the present disclosure comprises the steps of: assembling a shaft, an armature fixed on the shaft to be rotatably arranged, a commutator fixed on the shaft to rotate together with the armature, and a brush contacting a portion of the surface of the commutator; applying a voltage to the brush and rotating the armature and the commutator together through the rotation of the shaft to age the surface of the commutator; and, in a magnetizing device, connecting a case including a magnetized magnet to the assembled shaft, armature, commutator, and brush.

5 Claims, 8 Drawing Sheets

(51) Int. Cl.
*H02K 13/10* (2006.01)
*H02K 15/00* (2025.01)

(56) References Cited

FOREIGN PATENT DOCUMENTS

| JP | 05-276713 | 10/1993 | | |
|---|---|---|---|---|
| JP | 2001251817 A | * | 9/2001 | ............. B23P 19/00 |
| JP | 2003-180052 | | 6/2003 | |
| JP | 2003-250250 | | 9/2003 | |
| JP | 2003-264961 | | 9/2003 | |
| JP | 2005304257 A | * | 10/2005 | |
| JP | 2006-109667 | | 4/2006 | |
| JP | 2015-208199 | | 11/2015 | |

OTHER PUBLICATIONS

Written Opinion of the International Searching Authority for PCT/KR2020/008171 mailed on Nov. 19, 2020 (now published as WO 2021/015427) with English translation provided by Google Translate.

Office Action dated Jun. 22, 2024 for Chinese Patent Application No. 202080052057.X and its English translation provided by Applicant's foreign counsel.

* cited by examiner

FIG.1

RELATED ART

FIG.2

RELATED ART

FIG.3

RELATED ART

MOTOR MANUFACTURING METHOD AND MOTOR MANUFACTURING SYSTEM

TECHNICAL FIELD

The present disclosure relates to a motor manufacturing method and motor manufacturing system.

BACKGROUND ART

In a motor with brushes, the brushes are pressed in the direction of a commutator by a biasing means such as a spring. In addition, when the commutator rotates, the brush slides in contact with the surface of the commutator.

In the initial state in which the brush is assembled to contact the commutator, the contact state between the brush and the commutator is not stabilized, so noise is generated due to mechanical friction between the commutator and the brush. In addition, current ripple is generated due to assembly tolerance and surface roughness between the commutator and the brush, thereby causing noise.

DETAILED DESCRIPTION OF INVENTION

Technical Problem

In this background, an object of the present disclosure is to provide a motor manufacturing method and system for suppressing noise or vibration generated between the commutator and the brush by more efficiently stabilizing the contact state between the brush and the commutator.

Technical Solution

In order to solve the above problems, in one aspect, the present disclosure provides a motor manufacturing method including assembling a shaft, an armature fixed to the shaft and rotatably disposed, a commutator fixed to the shaft and rotating together with the armature, and a brush in contact with a portion of a surface of the commutator, aging a contact surface of the brush and the commutator by applying a voltage to the brush and rotating the armature and the commutator together through rotation of the shaft, and connecting a case including a magnetized magnet magnetized in a magnetizing device to the assembled shaft, armature, commutator and brush.

In another aspect, the present disclosure provides a motor manufacturing method including assembling a shaft, a commutator fixed to the shaft and rotatably disposed, and a brush in contact with a portion of a surface of the commutator, aging a contact surface of the brush and the commutator by applying a voltage to the brush and rotating the commutator together through rotation of the shaft, and connecting a case, which includes a magnetized magnet magnetized in a magnetizing device, to the assembled shaft, the commutator and the brush.

In another aspect, the present disclosure provides a motor manufacturing system including a voltage applier for applying a voltage to a brush after assembling a shaft, an armature fixed to the shaft and rotatably disposed, a commutator fixed to the shaft and rotating together with the armature, and the brush in contact with a portion of a surface of the commutator, a shaft rotating device for rotating the shaft to age a contact surface of the brush and the commutator by rotating the armature and the commutator, and a motor assembling device for connecting a case including a magnetized magnet magnetized in a magnetizing device to the assembled shaft, armature, commutator and brush.

In another aspect, the present disclosure provides a motor manufacturing system including a voltage applier for applying a voltage to a brush after assembling a shaft, a commutator fixed to the shaft and rotatably disposed, and the brush in contact with a portion of a surface of the commutator, a shaft rotating device for rotating the shaft to age the surface of the commutator by rotating the commutator, and a motor assembling device for connecting a case including a magnetized magnet magnetized in a magnetizing device to the assembled shaft, armature, commutator and brush.

Advantageous Effects

Embodiments of the present disclosure provide the effect of maximizing the aging effect and shortening the aging process time.

MODE FOR DISCLOSURE

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, etc.) include a tolerance or error range that may be caused by various factors (e.g., process factors, internal or external impact, noise, etc.) even when a relevant description is not specified.

In a motor with brushes, the brushes are pressed in the direction of a commutator by a biasing means such as a spring. In addition, when the commutator rotates, the brush slides in contact with the surface of the commutator. In the initial state in which the brush is assembled to contact the commutator, the contact state between the brush and the commutator is not stabilized, so noise is generated due to mechanical friction between the commutator and the brush. In addition, current ripple is generated due to assembly tolerance and surface roughness between the commutator and the brush, thereby causing noise.

Figure 1:
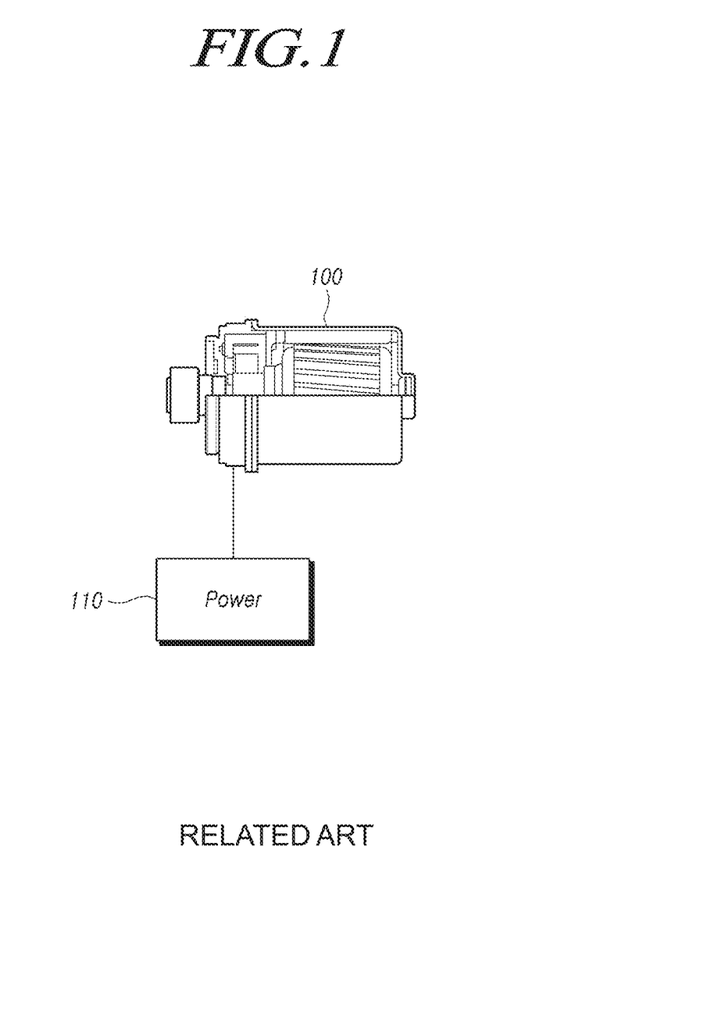
FIG. 1 is a diagram for explaining an example of a conventional motor manufacturing method.
Figure 2:
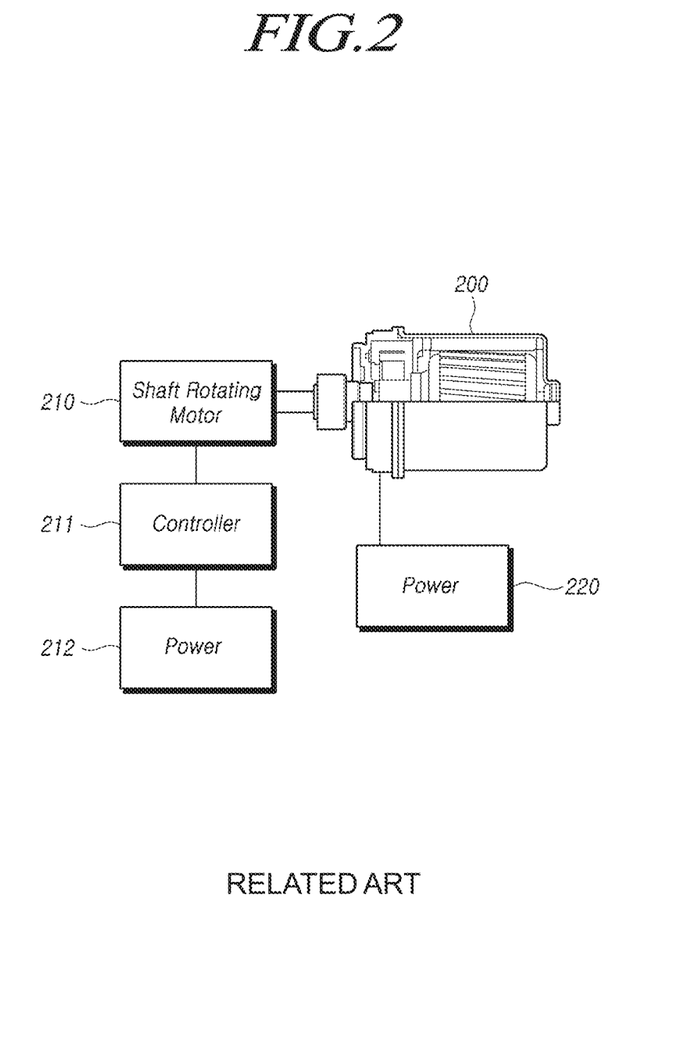
FIG. 2 is a diagram for explaining another example of a conventional motor manufacturing method.
Figure 3:
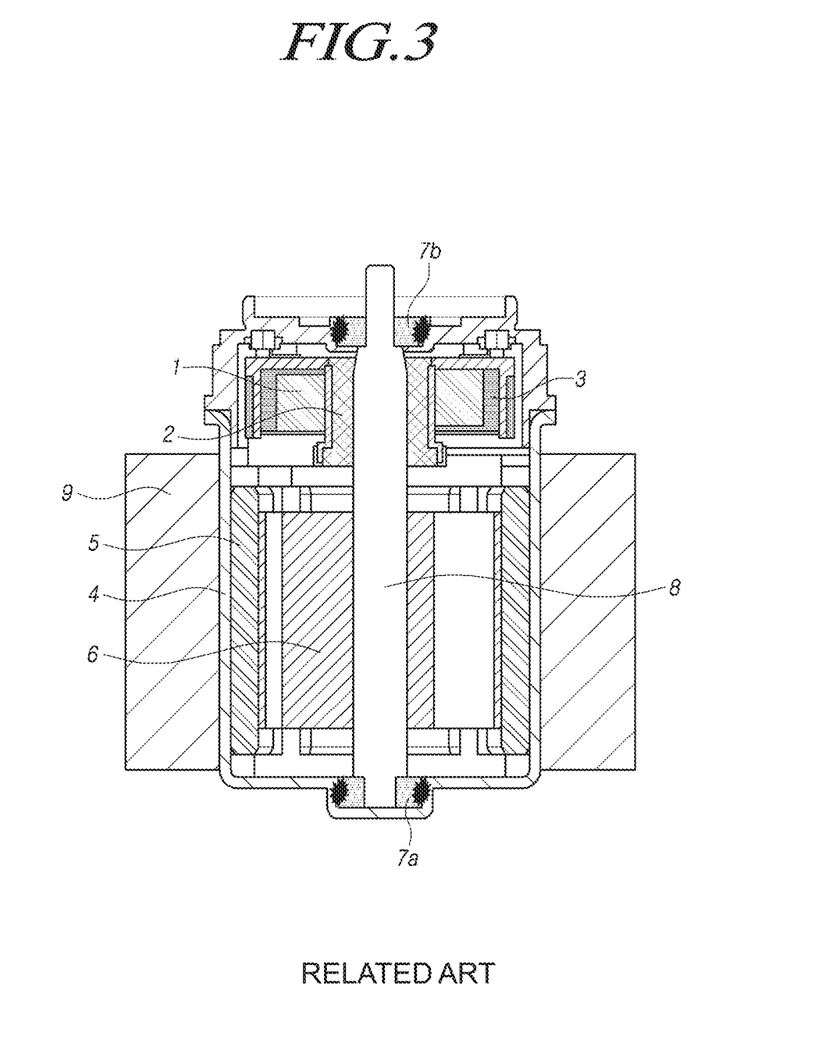
FIG. 3 is a diagram for explaining another example of a conventional motor manufacturing method.

In order to improve such a noise of a motor, a process of aging the motor in the manufacturing process is required. FIGS. 1 to 3 are diagrams for explaining an example of a conventional motor manufacturing method, illustrating a structure that can be applied when aging a motor.

First, in FIGS. 1 to 3, a motor includes a shaft 8, an armature 6 and a commutator 2 fixed to the shaft 8, a brush 1, a spring 3 for pressing the brush (1) in the direction of the commutator 2 so as for the brush 1 to contact the commutator 2, and a case 4 with magnet 5 attached inside and connected to shaft 8 by bearings 7. According to a conventional motor aging method, aging is performed in a motor in the state shown in FIGS. 1 to 3. In this specification, the shaft 8 and the components fixed to the shaft 8 and rotating together according to the rotation of the shaft 8 are referred to as a rotating body.

Figure 6:
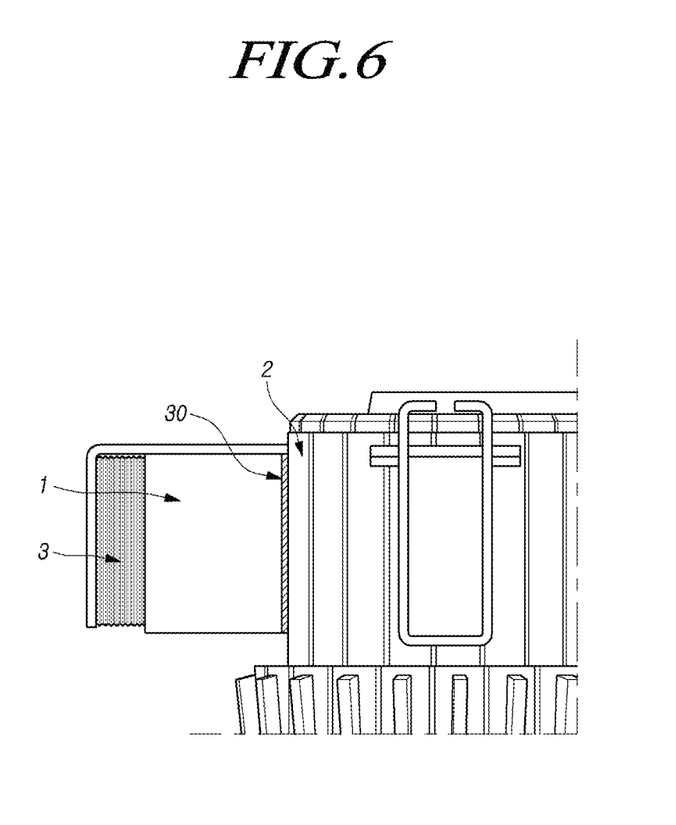
FIG. 6 is a diagram for explaining a process in which a carbon layer is formed on a surface of a commutator in a motor manufacturing method according to an embodiment of the present disclosure.

Specifically, in FIG. 1, the motor is in a state in which a case having a magnetized magnet is assembled to a rotating body, and the brush of the motor 100 is connected to the power 110. The motor rotates under no load, and the current cannot reach the temperature for forming a carbon layer on the brush due to low current. In the method of FIG. 6, only aging by mechanical friction is possible. For this reason, in the aging method as shown in FIG. 6, the motor is required to be rotated for a long time of 30 minutes or more, and the aging effect is also not large.

In FIG. 2, the motor 200 is in a state in which a case having a magnetized magnet is assembled to a rotating body, and in order to apply a load to the motor 200, a servo motor or a powder brake 210 is connected to the shaft of the motor 200, and a controller 211 and a power 212 for controlling the servo motor or the powder brake are connected in series. In the case of using the servo motor or the powder brake 210, if the rotation speed of the motor is increased to perform aging of the motor at high speed, the value of the current applied to the brush and the commutator according to a voltage equation of the motor decreases in inverse proportion to the speed due to the induced electromotive force (back electromotive force) by the magnet, so that it is difficult to form the carbon layer.

In order to form a carbon layer between brush 1 and commutator 2 due to mechanical wear of brush 1 and commutator 2 by a motor including a magnet 5 in a non-magnetized state for suppressing the induced electromotive force of the magnet, there may be a method of applying magnetizing power to the outside of the case 4 to magnetize the magnet 5 of the motor after mechanical wear and carbon layer formation, as shown in FIG. 3. However, if the magnet 5 of the motor is magnetized in the fully assembled state of the motor, the possibility of incomplete magnetization increases, and performance degradation and electrical noise may increase. In addition, the bearings 7a and 7b attached to the rotating body may be damaged by a strong impact during magnetization, thereby causing noise.

To solve this problem, the present disclosure provides a motor manufacturing method and system in which a carbon layer is formed on the surface of the commutator at the same time as the surface of the commutator is aged by rotating the armature and the commutator or the commutator fixed to the shaft in a state where the magnetized magnet is not provided, and applying a voltage to the brush, thereby flowing the current through the commutator. According to the present disclosure, since the surface aging of the commutator and the carbon layer formation is performed in a state where the magnetized magnet is not connected, the aging effect may be maximized and the aging process time can be shortened by the high speed and high current as the back electromotive force by the magnet is not generated.

Figure 4:
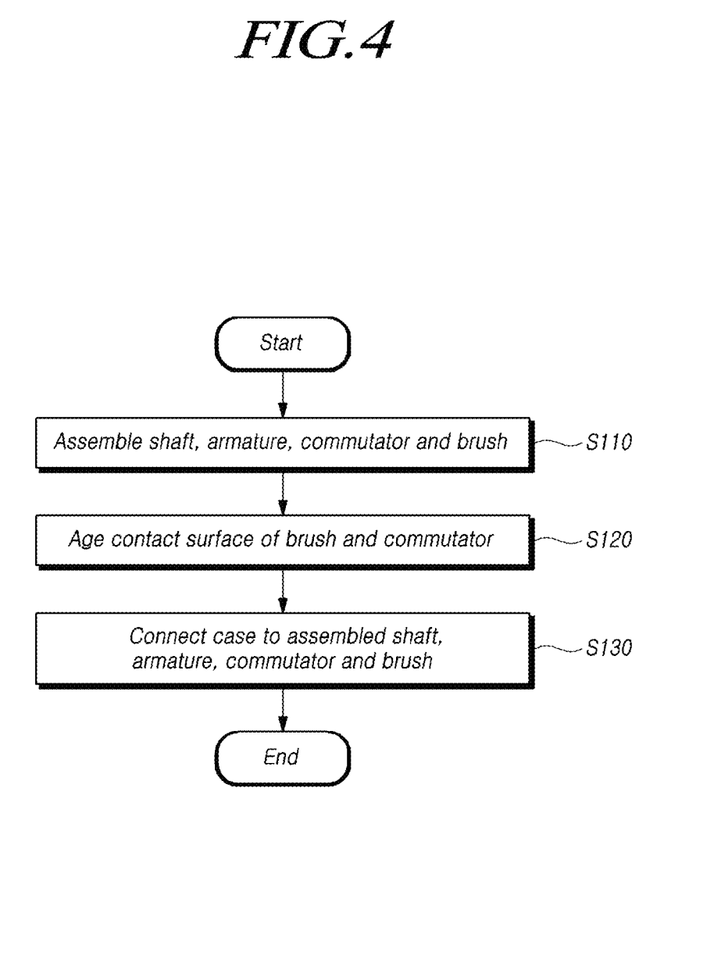
FIG. 4 is a flowchart illustrating a motor manufacturing method according to an embodiment of the present disclosure.
Figure 5:
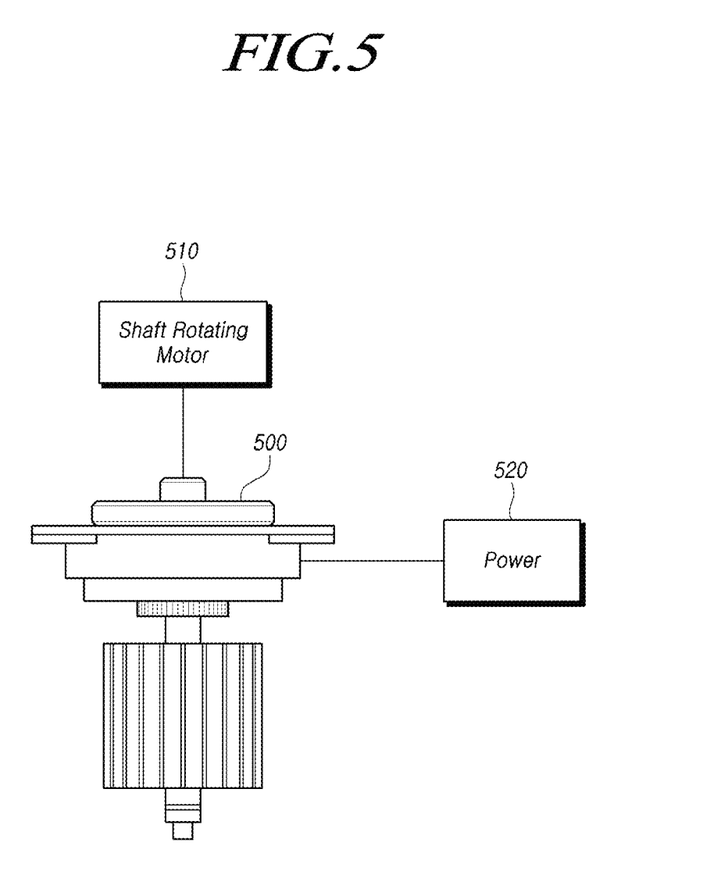
FIG. 5 is a diagram for explaining a motor manufacturing method using a rotating body including an armature in a state in which a shaft rotating motor and a power are respectively connected to a shaft and a brush, according to an embodiment of the present disclosure.

FIG. 4 is a flowchart illustrating a motor manufacturing method according to an embodiment of the present disclosure. In addition, FIG. 5 is a diagram for explaining a manufacturing method of a motor 500 using a rotating body including an armature in a state in which a shaft rotating motor 510 and a power 520 are respectively connected to a shaft and a brush, according to an embodiment of the present disclosure. This embodiment will describe a method of aging the surface of a commutator while the armature is included. In the present disclosure, the shaft rotating motor means a motor that rotates the shaft of the aging motor. In the present disclosure, in an aging motor, a shaft rotating by a shaft rotating motor and a component fixed to the shaft and rotating together with the shaft, for example, a stator and a commutator, are integrally indicated as a rotating body.

Referring to FIG. 4, the motor manufacturing method of the present disclosure may include assembling a shaft, an armature fixed to the shaft and rotatably disposed, a commutator fixed to the shaft and rotating together with the armature, and a brush in contact with a portion of a surface of the commutator (S110), aging a contact surface of the brush and the commutator by applying a voltage to the brush and rotating the armature and the commutator together through rotation of the shaft (S120), and connecting a case including a magnetized magnet magnetized in a magnetizing device to the assembled shaft, armature, commutator and brush (S130).

According to the present disclosure, first, there may be assembled a shaft, an armature fixed to the shaft and rotatably disposed, a commutator fixed to the shaft and rotating together with the armature, and a brush in contact with a portion of the surface of the commutator. In this step, components such as a shaft, an armature, a commutator, brushes, and a spring for pressing the brush in the direction of the commutator are assembled except for the case including the magnet inside. That is, an aging motor 200 is not in a fully assembled state with a magnet and a case, but in a state not including a magnetized magnet and a case for housing the motor.

In the basic assembly state formed by assembling the shaft, the armature, the commutator, and the brush, the power 220 applies a voltage to the brush. In addition, the shaft rotating motor 210 rotates the shaft. By the rotation of the shaft, the armature and the commutator of the motor 200 fixed to the shaft are also rotated, and accordingly, the contact surface between the commutator and the brush is aged.

In one embodiment, in the step of aging a contact surface of the brush and the commutator by applying a voltage to the brush and rotating the armature and the commutator together through rotation of the shaft, a carbon layer is formed on the surface of the commutator by applying a current to the commutator by the voltage applied to the brush.

FIG. 6 is a diagram for explaining a process in which a carbon layer is formed on a surface of a commutator in a motor manufacturing method according to an embodiment of the present disclosure.

In the basic assembly state formed by assembling the shaft, the armature, the commutator, and the brush, a voltage is applied to the brush by the power, and the rotating body rotates by the shaft rotating motor. In this case, as the brush 1 becomes negative (−) and the commutator 2 becomes positive (+), a minute arc discharge phenomenon occurs in the minute gap therebetween, and electrons from the brush 1 move, from the negative (−) side to the positive (+) side, toward the commutator 2. If electrons emitted from the brush 1 collide with the surface of the commutator 2, copper as a material of the commutator 2 may evaporate. The evaporated copper atoms collide with moving electrons and emit electrons to become $Cu2^+$. If the positive ions collide with the surface of the brush 1 which is the negative electrode, carbon atoms are emitted and the carbon layer 30 is formed on the surface of the commutator 2. In addition, at this time, the commutator 2 is heated by generating heat by electric current, so that carbon emitted from the brush 1 can be relatively easily attached to the surface of the commutator 2.

In addition, if the brush 1 is positive (+) and the commutator 2 is negative (−), electrons move from the commutator 2 toward the brush 1. The carbon particles on the surface of the brush 1 are separated by the collision of the electrons and adhered to the surface of the commutator 2. Accordingly, if a voltage is applied to the brush 1 and the commutator 2 is rotated, there may be formed an almost uniform carbon layer 30 on the surface of the commutator 2.

In one embodiment, the voltage applied to the brush may be set to a voltage greater than or equal to a voltage at which exothermic dissolution starts by applying a current to the commutator by the voltage applied to the brush. A current is applied to the brush and the commutator by the voltage applied to the brush, and the temperature rises. Accordingly, a carbon layer may be laminated on the contact surface of the brush and the commutator by the exothermic dissolution.

In one embodiment, the shaft rotating motor may rotate the shaft at a constant speed. That is, rotating the armature and the commutator together through the rotation of the shaft may mean rotating the shaft, the armature, and the commutator at a constant speed.

In another embodiment, the shaft rotating motor may rotate the shaft at a variable speed. That is, rotating the armature and the commutator together through the rotation of the shaft may mean rotating the shaft, the armature, and the commutator at a speed changing with time.

Since the motor manufactured by the motor manufacturing method of the present disclosure applies a voltage to the brush and rotates the rotating body in a state in which the magnetized magnet is not connected, there may not generate the induced electromotive force generated in the winding by the magnet.

Specifically, a voltage equation of the motor is as follows.

$$V = R*i + e + L\frac{di}{dt}$$ [Equation 1]

Here, V is the applied voltage, R is the resistance of the winding wound around the armature, L is the inductance of the winding, e is the induced electromotive force (back electromotive force) generated in the winding by the magnet, and i is the current flowing through the brush, commutator, and winding.

Here, the induced electromotive force generated in the winding by the magnet is defined by the following equation 2.

$$e = Ke*w$$ [Equation 2]

Here, Ke is the induced electromotive force constant, and w is the rotational speed of the motor.

In the conventional motor aging method, it is required to increase the rotational speed of the shaft to accelerate wear. In this case, the induced electromotive force generated in the winding by the magnet is increased by the increase of the rotational speed of the motor. As the rotational speed increases, the induced electromotive force increases, so the current flowing through the brush, the commutator and the winding becomes small, which is disadvantageous in forming the carbon layer.

Meanwhile, in the motor manufacturing method of the present disclosure, a voltage is applied to the brush and the rotating body is rotated in a state in which the magnetized magnet is not connected. Accordingly, since the induced electromotive force generated in the winding is not generated by the magnet, the rotating body can rotate at a high speed while applying a high current, and the aging speed of the motor can also be faster than the conventional aging method.

In one embodiment, rotating the armature and commutator together through rotation of the shaft may mean rotating the shaft in a first direction for a first time period and rotating in a second direction during a second time period. For example, the first direction and the second direction may be different directions. That is, the first direction may be a clockwise direction and the second direction may be a counterclockwise direction, or vice versa. As another example, the first time period and the second time period may be set to the same time range. As another example, the first time period and the second time period may be set to different time ranges. For example, if the first time period is 1 second, the second time period may be set to exceed 1 second.

Alternatively, the above-described direction, time period, and speed may be combined in various embodiments. For example, the rotation of the commutator by the rotation of the shaft may be performed in a clockwise direction for 10 seconds and then in a counterclockwise direction for 10 seconds. Alternatively, the rotation of the commutator by the rotation of the shaft is performed clockwise for 20 seconds, and the speed of the initial 10 seconds and the speed of the latter 10 seconds may be different from each other. Alternatively, the rotation of the commutator by the rotation of the shaft may be performed for 5 seconds in a clockwise direction and in a counterclockwise direction for 15 seconds. In addition, each embodiment of fixed and variable speed, same and opposite direction, same and different time period may be combined with each other.

In the present disclosure, a case including a magnetized magnet magnetized in a magnetizing device is connected to an assembled shaft, an armature, a commutator and a brush. The magnet is magnetized in a magnetizing device separate from the motor, shaft rotating motor, and power of the present disclosure, and after aging of the contact surface between the commutator and the brush is completed, a case including the magnetized magnet is coupled to the motor. In the motor manufacturing method of the present disclosure, instead of rotating a motor with a case containing the magnetized magnet to age the motor, or instead of combining, after aging the motor, a case containing a magnet in the pre-magnetized state and connecting the motor to the magnetizing device to magnetize the motor, the motor is aged in a state that does not include the magnet before coupling to the case, and the case including a magnet magnetized in a separate magnetizing device is coupled to the motor. Therefore, since the aging can be performed by rotating the motor without back electromotive force by the magnet, it is possible to implement the efficient aging in a short time.

As described above, according to the present disclosure, the carbon layer is formed on the surface of the commutator at the same time as the surface of the commutator is aged by rotating the armature and the commutator or the commutator fixed to the shaft in a state where the magnetized magnet is not provided, and applying a voltage to the brush, thereby flowing the current through the commutator. In the present disclosure, since the surface aging of the commutator and the carbon layer formation is performed in a state where the magnetized magnet is not connected, the aging effect may be maximized and the aging process time can be shortened by the high speed and high current as the back electromotive force by the magnet is not generated.

In one embodiment, the motor manufacturing method of the present disclosure may include assembling a shaft, a commutator fixed to the shaft and rotatably disposed, and a brush in contact with a portion of a surface of the commutator, aging a contact surface of the brush and the commutator by applying a voltage to the brush and rotating the commutator together through rotation of the shaft, and connecting a case, which includes a magnetized magnet magnetized in a magnetizing device, to the assembled shaft, the commutator and the brush. That is, in this embodiment, the aging of the contact surface of the brush and the commutator is implemented in a state before the case including the armature and the magnet is coupled.

Figure 7:
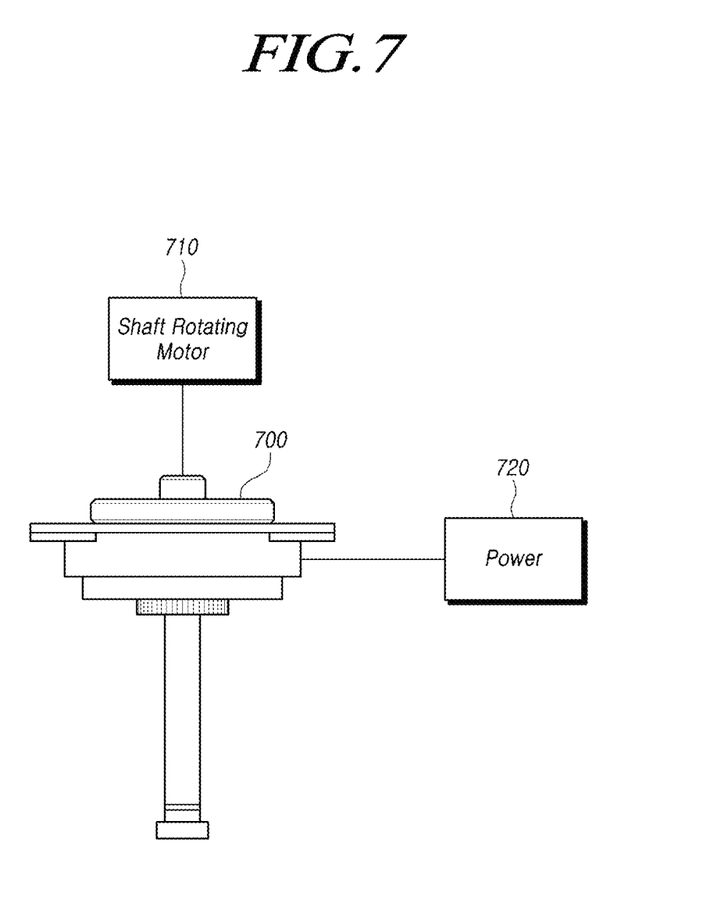
FIG. 7 is a diagram for explaining a motor manufacturing method using a rotating body that does not include an armature in a state in which a shaft rotating motor and a power are respectively connected to a shaft and a brush, according to an embodiment of the present disclosure.

The motor manufacturing method of this embodiment may refer to FIG. 7. FIG. 7 is a diagram for explaining a motor manufacturing method in which the motor is aged by rotating a rotating body not including an armature in a state in which a shaft rotating motor and a power are respectively connected to a shaft and a brush, according to an embodiment of the present disclosure.

According to the present disclosure, first, a shaft, a commutator fixed to the shaft and rotating together with an armature, and a brush in contact with a portion of the surface of the commutator are assembled. The aging motor 700 is not in a fully assembled state having an armature, a magnet, and a case, but is in a state that does not include an armature, a magnetized magnet, and a case for casing the motor.

In the basic assembly state in which the shaft, the commutator, and the brush are assembled, the power 720 applies a voltage to the brush. In addition, the shaft rotating motor 710 rotates the shaft. The commutator of the motor 700 fixed to the shaft is also rotated by the rotation of the shaft, and thus the contact surface between the commutator and the brush is aged.

In one embodiment, in the step of aging the surface of the commutator by applying a voltage to the brushes and rotating the commutator together through the rotation of the shaft, a carbon layer is formed on the surface of the commutator by applying a current to the commutator by the voltage applied to the brush.

In one embodiment, the voltage applied to the brush may be set to a voltage greater than or equal to a voltage at which exothermic dissolution starts by applying a current to the commutator by the voltage applied to the brush. A current is applied to the brush and the commutator by the voltage applied to the brush, and the temperature rises. Accordingly, a carbon layer may be laminated on the contact surface of the brush and the commutator by the exothermic dissolution.

In one embodiment, rotating the commutator together through the rotation of the shaft may be rotating the shaft at a constant speed. In another embodiment, rotating the commutator together through the rotation of the shaft may be rotating the shaft at a variable speed. Since a DC motor manufactured by the motor manufacturing method of the present disclosure is applies a voltage to the brush and rotates the rotating body in a state in which the magnetized magnet is not connected, there may not generate the induced electromotive force generated in the winding by the magnet. Accordingly, the rotating body can rotate at a high speed while applying a high current, and the aging speed of the motor can also be faster than the conventional aging method.

In one embodiment, the shaft rotating motor may rotate the shaft clockwise for a first time period and counterclockwise for a second time period. Alternatively, as described above, the rotation directions of the first time period and the second time period may be the same. As an example, the first time period and the second time period may be the same or different. For example, the rotation of the commutator by the rotation of the shaft may be performed in a clockwise direction for 10 seconds and then in a counterclockwise direction for 10 seconds. In addition, as described above, the rotation operation may be determined by a combination of each embodiment of speed, direction, and time period.

In the present disclosure, a case including an armature and a magnetized magnet magnetized in a magnetizing device is connected to an assembled shaft, an armature, a commutator and a brush. The magnet is magnetized in a magnetizing device separate from the motor, shaft rotating motor, and power of the present disclosure, and after aging of the contact surface between the commutator and the brush is completed, a case including the armature and the magnetized magnet is coupled to the motor. In the motor manufacturing method of the present disclosure, instead of rotating a motor with a case containing the magnetized magnet to age the motor, or instead of combining, after aging the motor, a case containing a magnet in the pre-magnetized state and connecting the motor to the magnetizing device to magnetize the motor, the motor is aged in a state that does not include the magnet before coupling to the case, and the case including a magnet magnetized in a separate magnetizing device is coupled to the motor. Therefore, since the aging can be performed at high speed and high current by rotating the motor without back electromotive force by the magnet, it is possible to implement the efficient aging in a short time.

Figure 8:
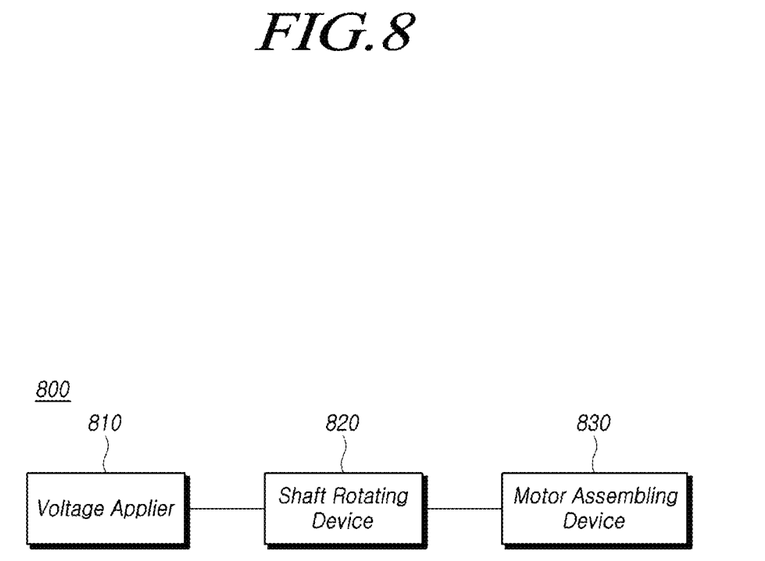
FIG. 8 is a diagram illustrating a configuration of a motor manufacturing system according to an embodiment of the present disclosure.

FIG. 8 is a diagram illustrating a configuration of a motor manufacturing system according to an embodiment of the present disclosure. Referring to FIG. 8, a motor manufacturing system 800 of the present disclosure may include a voltage applier 810 for applying a voltage to a brush after assembling a shaft, an armature fixed to the shaft and rotatably disposed, a commutator fixed to the shaft and rotating together with the armature, and the brush in contact with a portion of a surface of the commutator, a shaft rotating device 820 rotating the shaft to age a contact surface of the brush and the commutator by rotating the armature and the commutator, and a motor assembling device 830 for connecting a case including a magnetized magnet magnetized in a magnetizing device to the assembled shaft, armature, commutator and brush.

According to the present disclosure, first, there may be assembled a shaft, an armature fixed to the shaft and rotatably disposed, a commutator fixed to the shaft and rotating together with the armature, and a brush in contact with a portion of the surface of the commutator. In this case, components such as a shaft, an armature, a commutator, brushes, and a spring for pressing the brush in the direction of the commutator are assembled except for the case including the magnet inside. That is, an aging motor is not in a fully assembled state with a magnet and a case, but in a state not including a magnetized magnet and a case for housing the motor.

In the basic assembly state formed by assembling the shaft, the armature, the commutator, and the brush, the voltage applier 810 applies a voltage to the brush. In addition, the shaft rotating device 820 rotates the shaft. By the rotation of the shaft, the armature and the commutator of the motor fixed to the shaft are also rotated, and accordingly, the contact surface between the commutator and the brush is aged.

In one embodiment, a carbon layer is formed on the surface of the commutator by applying a current to the commutator by the voltage applied to the brush by the voltage applier 810. In the basic assembly state formed by assembling the shaft, the armature, the commutator, and the brush, a voltage is applied to the brush by the power, and the rotating body rotates by the shaft rotating motor. In this case, as the brush becomes negative (−) and the commutator becomes positive (+), a minute arc discharge phenomenon occurs in the minute gap therebetween, and electrons from the brush move, from the negative (−) side to the positive (+) side, toward the commutator. If electrons emitted from the brush collide with the surface of the commutator, copper as a material of the commutator may evaporate. The evaporated copper atoms collide with moving electrons and emit electrons to become $Cu^{2+}$. If the positive ions collide with the surface of the brush which is the negative electrode, carbon atoms are emitted and the carbon layer is formed on the surface of the commutator. In addition, at this time, the commutator is heated by generating heat by electric current, so that carbon emitted from the brush can be relatively easily attached to the surface of the commutator.

In addition, if the brush is positive (+) and the commutator is negative (−), electrons move from the commutator toward the brush. The carbon particles on the surface of the brush are separated by the collision of the electrons and adhered to the surface of the commutator. Accordingly, if a voltage is applied to the brush and the commutator is rotated, there may be formed an almost uniform carbon layer on the surface of the commutator.

In one embodiment, the voltage applied to the brush may be set to a voltage greater than or equal to a voltage at which exothermic dissolution starts by applying a current to the commutator by the voltage applied to the brush. A current is applied to the brush and the commutator by the voltage applied to the brush, and the temperature rises. Accordingly, a carbon layer may be laminated on the contact surface of the brush and the commutator by the exothermic dissolution.

In one embodiment, the shaft rotating device 820 may rotate the shaft. The description of the rotational speed, rotation direction, and rotation time period are omitted since they correspond to those described above. That is, rotating the armature and the commutator together through the rotation of the shaft may mean rotating the shaft, the armature, and the commutator at a constant speed. According to the motor manufactured by the motor manufacturing system of the present disclosure, since a voltage is applied to the brush and the rotating body is rotated in a state in which the magnetized magnet is not connected, the induced electromotive force generated in the winding is not generated by the magnet. Accordingly, the rotating body can rotate at a high speed while applying a high current, and the aging speed of the motor can also be faster than the conventional aging method.

In one embodiment, the shaft rotating device 520 may rotate the shaft clockwise during the first time period and counterclockwise during the second time period. As an example, the first time period and the second time period may be the same. In addition, the above-described rotation speed, rotation direction, and rotation time period may be variously combined and performed. For example, the rotation of the commutator by the rotation of the shaft may be performed in a clockwise direction for 10 seconds and then in a counterclockwise direction for 10 seconds.

In the present disclosure, the motor assembling device 830 connects a case including the magnet magnetized in the magnetizing device to the assembled shaft, the armature, the commutator, and the brush. The magnet is magnetized in a magnetizing device separate from the motor, shaft rotating motor, and power of the present disclosure, and after aging of the contact surface between the commutator and the brush is completed, the case including the magnetized magnet is coupled to the motor. In the motor manufacturing system of the present disclosure, instead of rotating a motor with a case containing the magnetized magnet to age the motor, or instead of combining, after aging the motor, a case containing a magnet in the pre-magnetized state and connecting the motor to the magnetizing device to magnetize the motor, the motor is aged in a state that does not include the magnet before coupling to the case, and the case including a magnet magnetized in a separate magnetizing device is coupled to the motor. Therefore, since the aging can be performed by rotating the motor without back electromotive force by the magnet, it is possible to implement the efficient aging in a short time.

As described above, according to the present disclosure, the carbon layer is formed on the surface of the commutator at the same time as the surface of the commutator is aged by rotating the armature and the commutator or the commutator fixed to the shaft in a state where the magnetized magnet is not provided, and applying a voltage to the brush, thereby flowing the current through the commutator. According to the present disclosure, since the surface aging of the commutator and the carbon layer formation is performed in a state where the magnetized magnet is not connected, the aging effect may be maximized and the aging process time can be shortened by the high speed and high current as the back electromotive force by the magnet is not generated.

In one embodiment, the motor manufacturing system of the present disclosure may include a voltage applier for applying a voltage to a brush after assembling a shaft, a commutator fixed to the shaft and rotatably disposed, and a brush in contact with a portion of a surface of the commutator, a shaft rotating device for rotating the shaft to age the surface of the commutator by rotating the commutator, and a motor assembling device for connecting a case including a magnetized magnet magnetized in a magnetizing device to the assembled shaft, armature, commutator and brush. That is, in this embodiment, the aging of the contact surface aging of the brush and the commutator is performed in a state before coupling the case including the armature and the magnet. The motor manufacturing system of this embodiment may utilize the motor aging method of the above-described motor manufacturing system without including the armature. Accordingly, the description of the motor manufacturing system of this embodiment may refer to the description of the motor manufacturing system of FIG. 8 described above.

The terms "system", "processor", "controller", "component", "module", "interface", "model", "unit", etc. described above may generally refer to computer-related entity hardware, a combination of hardware and software, software or software in execution. For example, the aforementioned component may be a process run by a processor, a processor, a controller, a controlling processor, an object, a thread of execution, a program, and/or a computer, but is not limited thereto. For example, both an application running on a controller or processor and a controller or processor can be a component. One or more components may reside within a process and/or thread of execution, and components may be located on one system or distributed across two or more systems.

Terms such as "include", "comprise" or "have" described above mean that the corresponding component may be embedded unless otherwise stated, and it should not be constructed as excluding other components, but may further include other components. All terms, including technical and scientific terms, have the same meaning as commonly understood by one of ordinary skill in the art to which this disclosure belongs, unless otherwise defined. Commonly used terms, such as those defined in the dictionary, should be interpreted as being consistent with the meaning of the context of the related art, and are not interpreted in an ideal or excessively formal meaning unless explicitly defined in the present disclosure.

The above description and attached drawings have been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This patent application is the national stage of International Patent Application No. PCT/KR2020/008171 filed on Jun. 23, 2020 which claims priority in accordance with Article 119(a) of the U.S. Patent Law (35 USC § 119(a)) for Patent Application No. 10-2019-0087429 filed in Korea on Jul. 19, 2019, which all contents are incorporated into this patent application by reference. In addition, if this patent application claims priority for countries other than the United States for the same reason as above, all the contents are incorporated into this patent application as references.

The invention claimed is:

1. A motor manufacturing method comprising:
   assembling a shaft, an armature fixed to the shaft and rotatably disposed, a commutator fixed to the shaft and rotating together with the armature, and a brush in contact with a portion of a surface of the commutator;
   in a state that a magnetized magnet is not connected, aging a contact surface of the brush and the commutator by applying a voltage to the brush and rotating the armature and the commutator together through rotation of the shaft; and
   connecting a case including the magnetized magnet magnetized in a magnetizing device to the assembled shaft, armature, commutator and brush,
   wherein rotating the armature and the commutator together through rotation of the shaft comprises rotating the shaft in a first direction during a first time period and rotating in a second direction opposite to the first direction during a second time period, and
   wherein the first time period and the second time period are set to different time ranges.

2. The motor manufacturing method of claim 1, wherein aging a contact surface of the brush and the commutator by applying a voltage to the brush and rotating the armature and the commutator together through rotation of the shaft comprises forming a carbon layer on the surface of the commutator by applying a current to the commutator by the voltage applied to the brush.

3. The motor manufacturing method of claim 2, wherein the voltage applied to the brush is set to a voltage equal to or higher than a voltage at which exothermic dissolution starts by applying the current to the commutator by the voltage applied to the brush.

4. A motor manufacturing method comprising:
   assembling a shaft, a commutator fixed to the shaft and rotatably disposed, and a brush in contact with a portion of a surface of the commutator;
   in a state that a magnetized magnet is not connected, aging a contact surface of the brush and the commutator by applying a voltage to the brush and rotating the commutator together through rotation of the shaft; and connecting a case, which includes an armature and the magnetized magnet magnetized in a magnetizing device, to the assembled shaft, the commutator and the brush, wherein rotating the commutator together through rotation of the shaft comprises rotating the shaft in a first direction during a first time period and rotating in a second direction opposite to the first direction during a second time period, and wherein the first time period and the second time period are set to different time ranges.

5. The motor manufacturing method of claim 4, wherein aging a contact surface of the brush and the commutator by applying a voltage to the brush and rotating the commutator together through rotation of the shaft comprises forming a carbon layer on the surface of the commutator by applying a current to the commutator by the voltage applied to the brush.

\* \* \* \* \*